DIGITAL COMPUTER CHECKING MEANS FOR ANALOG COMPUTER

Filed Nov. 26, 1963 3 Sheets-Sheet 1

INVENTOR.
JOHN N. A. HAWKINS
BY Zulwider, Patton, Rieber, Lee, and Utecht
ATTORNEYS INVENTOR.
JOHN N. A. HAWKINS
BY Lulwider, Patton, Rieber, Lee, and Utecht
ATTORNEYS July 11, 1967 J. N. A. HAWKINS 3,330,943

DIGITAL COMPUTER CHECKING MEANS FOR ANALOG COMPUTER

Filed Nov. 26, 1963 3 Sheets-Sheet 3

INVENTOR.
JOHN N.A. HAWKINS
BY Fulwider, Patton, Rieber, Lee, and Utecht
ATTORNEYS 3,330,943

DIGITAL COMPUTER CHECKING MEANS FOR ANALOG COMPUTER

John N. A. Hawkins, Pacific Palisades, Calif., assignor to System Development Corporation, Santa Monica, Calif.
Filed Nov. 26, 1963, Ser. No. 326,039
2 Claims. (Cl. 235—150.5)

ABSTRACT OF THE DISCLOSURE

Computer apparatus having an analog computing section and a digital computing section together with switching means, comparison means and error correction means enabling the digital computing section to periodically check and precision adjust various analog elements in the analog computing section.

This invention relates generally to computers, and more particularly to a new and improved method and means of analog computation or simulation wherein the analog computing elements are precision adjusted by a digital computing system at a rate which is relatively fast compared with the drift rate of the analog computing elements, but at a rate which may be relatively slow compared with the problem solution rate of the analog system.

In the computer arts, it is well known that analog computers are extremely fast and relatively inexpensive devices. However, these advantages of speed and economy are frequently offset by the fact that such analog computers are relatively imprecise. In this connection, although analog computers may typically handle problems at a rate of .001 second per problem, the present practical limit for static accuracy of individual analog elements is only about 0.1 percent, and even this accuracy is subject to drift and difficult to maintain over any extended interval of time under varying conditions of temperature and humidity. This lack of precision is subject to still further degradation by dynamic simulation and by cumulative errors in the overall system. As the complexity of the problem increases, more analog equipment is required to handle the problem and, although the speed of computation remains essentially the same, the analog errors of individual computing elements accumulate and thereby produce less accurate problem solutions.

On the other hand, digital computers are relatively slow, and expensive but very precise, e.g., a precision of $10^{-6}$ percent overall with a problem solution rate of about 1 second per problem. In this connection, the accuracy of a digital computer is limited solely by the number of digits it is designed to handle. Hence, as more accurate solutions are required for complex physical systems, analog techniques may prove inadequate to the task, and resort must be had to the more expensive digital techniques. Although the computer running time is increased, the solution of complex problems may be handled by digital computers without additional equipment by providing the digital computer with a memory of sufficient capacity.

Summarily stated, therefore, digital computers are preferred where the accuracy required exceeds that obtainable by analog means. On the other hand, analog simulation is more desirable where problem solution rate is the dominating factor or where exceptionally high accuracy is not a requisite. Moreover, since most physical quantities are related to others by continuous functions, the continuous graphic presentation of a solution by an analog computer is more readily comprehensible than the discrete numerical presentation of a digital computer. Furthermore, where it is desired to connect actual system components, which are analog in nature, into a simulation, it is evident that analog techniques are clearly preferred.

In an effort to most advantageously exploit the desirable features of both analog and digital computers, hybrid computers, i.e., those embodying computing elements of both the analog and digital types, have experienced increasing popularity in recent years. Unfortunately, however, the analog computing elements in such hybrid systems are capable of no greater accuracy in solving problems than conventional analog computers, and the dominance of digital computing elements for satisfying precision problem solution requirements adds prohibitively to the overall cost of the hybrid system. Hence, those concerned with the development of electronic computing systems have long recognized the need for a relatively inexpensive computer capable of solving problems with analog speed and near digital precision. The present invention clearly fulfills this need.

Accordingly, it is an object of the present invention to provide a new and improved means of computation which overcomes the above and other disadvantages of the prior art.

Another object is to provide a new and improved analog computer having greater accuracy with no sacrifice in speed.

A further object of the invention is the provision of a means for adjusting analog computing elements with digital precision.

Still another object is to provide a new and improved electronic computer system wherein the elements of an analog computer are periodically checked and readjusted by a relatively slow and inexpensive digital computer.

Yet another object of the present invention is the provision of a new and improved means for enhancing the dynamic accuracy of an analog computer.

A still further object is to provide a means of controlling analog elements in a computer system in accordance with the individual drift rate of each element, but independent of the problem solution rate of the analog system.

Still another object is to provide a new and improved means of analog computation wherein the analog elements are adjusted with digital precision in a manner which does not interfere with the normal operation of the analog system and consequently eliminates the necessity for analog computer down time.

The above and other objects and advantages of this invention will be better understood by reference to the following detailed description, when considered in connection with accompanying drawings of illustrative embodiments thereof, and wherein.

Figure 1:
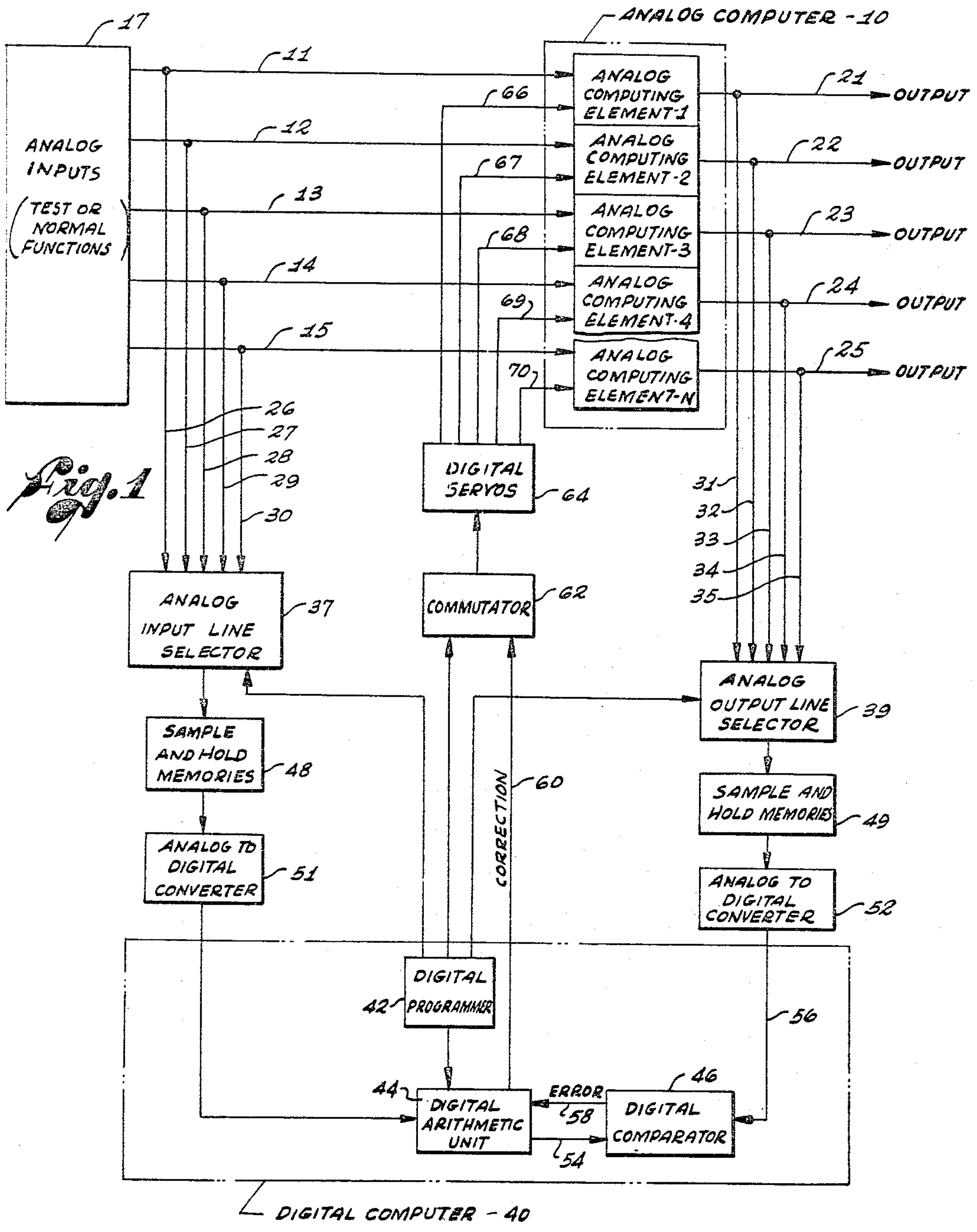
FIGURE 1 is a block diagram of one embodiment of a hydrid analog-digital computer embodying the present invention.

Referring now to FIGURE 1 of the drawings, there is shown an analog computer 10 which is schematically depicted as including an indeterminate plurality of individual analog computing elements 1, 2, 3, 4 . . . *n*. These analog computing elements may be interconnected in any desired manner for a specific problem solution or to accomplish a particular simulating operation. However, the specific circuit relationships between the various analog computing elements form no part of the present invention and, therefore, will not be further discussed. Rather, the present invention is concerned solely with means for periodically checking and readjusting the values of the various circuit parameters within each of the analog computing elements to provide and maintain analog computation accuracy heretofore generally unobtainable.

Each of the analog computing elements 1, 2, 3, 4, *n* is provided with a signal input line 11, 12, 13, 14 and 15, respectively. Similarly, each of the analog computing elements is provided with a signal output line 21, 22, 23, 24 and 25, respectively. In this connection, although each computing element of the analog computer 10 is illustrated as having only a single input line and a single output line, this is by way of example only, and it is to be understood that each analog computing element may have any number of inputs and any number of outputs. Moreover, the analog computing elements 1, 2, 3, 4, *n* may include any type of simulation devices such as operational amplifiers, electronic multipliers, diode function generators, servomultipliers, resolvers, quarter square multipliers, pot padders, etc. for performing either linear or nonlinear simulation. Each of the aforementioned analog devices is generally utilized in the specific area of simulation in which that device performs most efficiently.

Each of the input lines 11–15 directs one or more input signals to its respective analog computing element from an appropriate analog input source 17. The analog input source 17 may provide normal functions in accordance with a specific problem or series of problems to be solved, or it may provide for the generation of a special test function for the specific purpose of checking the individual computing elements of the analog computer 10.

Each of the input lines 11–15 is connected to a sampling line 26–30, respectively. In this connection, where each input line in the input line group 11–15 is representative of more than a single input to its respective analog computing element, a separate, sampling line is provided for each input. Similarly, each of the output lines 21–25 of the analog computer 10 is connected to its own output sampling line 31–35, respectively. Each of the analog input sampling lines 26–30 is directed to an analog input line selector 37, whereas each of the analog output sampling lines 31–35 is directed to an analog output line selector 39.

As shown in FIGURE 1, the hybrid system also includes a digital computer 40. The computer 40 is a slow, relatively inexpensive digital device including a digital programmer 42, a digital arithmetic unit 44 and a digital comparator 46.

Both the analog input line selector 37 and the analog output line selector 39 are commutator-type devices which are under the control of the digital programmer 42, so that the output line selected at any particular time corresponds to the appropriate input line selected for the particular analog computing element being checked. Hence, the digital programmer 42 assures synchronism between the input and output sampling line selectors 37, 39, respectively, so that periodic simultaneous hacks of the input and output analog functions are properly taken.

The output from the input sampling line selector 37 is directed to a sample and hold memory unit 48 to compensate for the difference in input handling rates between the analog computer 10 and the digital computer 40. Hence, the sample and hold memory 48 records and stores the analog function being sampled so that it can subsequently be fed into the digital computer 40 at the proper rate for the digital computer. In this manner, the sample and hold memory essentially behaves as a buffer stage. Similarly, the output from the output sampling liner selector 39 is directed as input to a sample and hold memory 49 which simultaneously stores the output analog function corresponding to the input analog function sampled and stored by the memory 48.

Before the digital computer 40 can work upon the data stored in the memories 48, 49, this information must be placed in proper form for assimilation by the digital computer. These operations are accomplished by the analog to digital converters 51, 52 for the input and output memories 48, 49, respectively.

The output of the analog to digital converter 51 is directed as an input to the digital arithmetic unit 44 within the digital computer 40. The digital arithmetic unit 44 is under the control of the digital programmer 42 so that it is automatically set up to perform the same mathematical operations digitally as the particular analog computing element whose input is being sampled is adapted to perform by analog techniques. The output of the digital arithmetic unit 44, which is a precise digital solution for the sample data, is directed over an output line 54 as one input to the digital comparator 46. The other input to the digital comparator 46 is over the line 56 from the analog to digital converter 52 and consists of the less precise converted analog solution of the same sample data operated upon by the digital aritthmetic unit 44.

The digital comparator 46 is essentially a digital subtraction device which senses the difference between its two inputs, i.e., from the arithmetic unit 44 and the converter 52, to generate a corresponding error signal. This error signal is, in turn, directed over a line 58 back to the digital arithmetic unit 44.

The digital arithmetic unit 44 is under the control of the digital programmer 42 to act upon the error signal from the digital comparator 46 to generate a correction signal having a magnitude and polarity corresponding to the magnitude of the error and the particular analog computing element being checked. Hence, the correction signal generated by the digital arithmetic unit 44 may extend over a wide range for the same error signal input to the arithmetic unit, depending upon what the correction signal has to do, the latter being dependent upon the type of simulation element being checked and corrected in the analog computer 10.

The correction signal is directed over a line 60 to an appropriate switching device or commutator 62 which, in turn, feeds the correction signal to a selected digital servo 64 stepping switch or the like in a bank of such units. Each of the digital servos 64 trims or otherwise controls the settings of an appropriate drift correcting function for one of the analog computing elements, 1, 2, 3, 4, *n* in the analog computer 10, as schematically indicated by the correction lines 66, 67, 68, 69, 70, respectively, for these analog computing elements.

The commutator 62 is also under control of the digital programmer 42 so that the appropriate digital servo 64 is selected for the particular analog computing element whose input and output data have been selected and operated upon by the digital computer 40. In summary, therefore, the digital programmer 42 of the computer 40 performs the following functions:

(a) It programs the sample line selectors 37, 39 for periodic simultaneous hacks of input and output analog functions for common analog computing elements, so that the input and output sampling systems remain in proper synchronism.

(b) It programs the digital arithmetic unit 44 so that it performs the same mathematical operations upon the converted input data as are performed by the particular analog computing element being checked.

(c) It programs the digital arithmetic unit so that the latter provides the proper type of correction signal for the particular analog computing element being checked and adjusted.

(d) It programs the commutator 62 so that the correction signal is directed to the appropriate digital correction circuit for the particular analog computing element being checked and adjusted.

In addition to the aforedescribed functions, the digital programmer 42 can be used to program the system so that the analog computing elements of the computer 10 are checked and readjusted nonuniformly. In this connection, the system may be programmed to check and readjust some of the analog computing elements more often than others, in accordance with the individual drift rates or the like of each of the analog computing elements. Hence, the most error prone computing elements in the analog portion of the system would be more frequently surveyed by the digital system than the less error prone computing elements in the analog system. This permits efficient use of a slower and cheaper digital computer than would otherwise be necessary if every analog computing element had to be checked as frequently as every other analog computing element and the minimum frequency of checking for each element is determined by the most error prone element in the system.

It will be apparent that the hybrid system of FIGURE 1 assures that each analog computing element performs during dynamic simulation with precision approaching the static accuracy of the element. Hence, comulative errors which typically plague computing systems are considerably reduced because of the extremely high dynamic precision of all of the computing elements making up the system.

Figure 2:
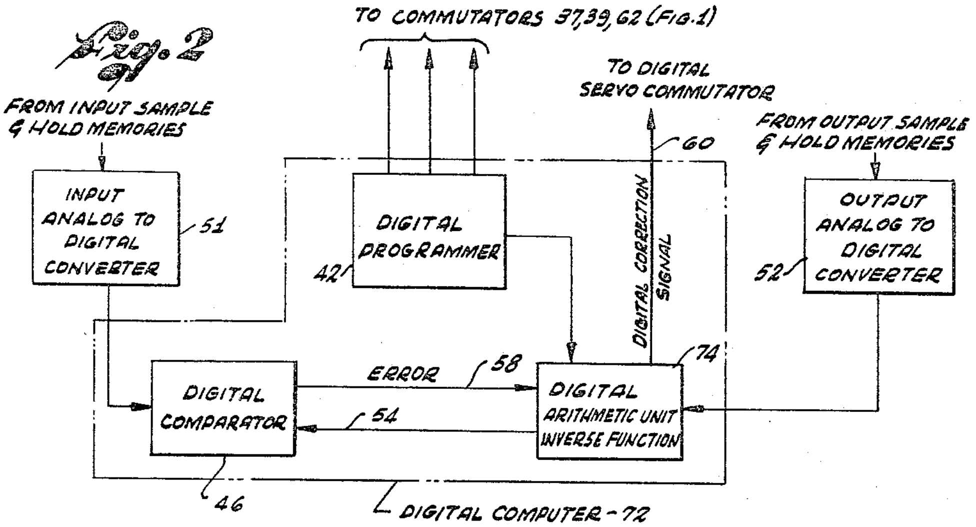
FIGURE 2 is a block diagram of another embodiment of a hybrid analog-digital computer embodying the teachings of the present invention.

Referring now to FIGURE 2 of the drawings, there is shown another embodiment of a hybrid computer system in accordance with the invention. The system of FIGURE 2 is essentially a duplicate of the system of FIGURE 1, with the exception of the digital computer denoted generally by the reference numeral 72 in FIGURE 2. In this regard, like reference numerals in FIGURE 2 denote like or corresponding elements in the system of FIGURE 1.

As in the system of FIGURE 1, the input and output analog to digital converters 51, 52, respectively, in FIGURE 2 direct inputs to the digital computer 72. However, the output analog to digital converter 52 feeds a digital arithmetic unit 74 rather than the digital comparator 46. Conversely, the input analog to digital converter 51 feeds the digital comparator 46, rather than the arithmetic unit as in FIGURE 1. The other major distinction between the systems of FIGURES 1 and 2 resides in the digital arithmetic unit 74 itself. In this connection, whereas the digital arithmetic unit 44 in FIGURE 1 is programmed by the digital programmer 42 to perform exactly the same mathematical operations as the analog computing element being checked, the arithmetic unit 74 in FIGURE 2 operates upon the output function rather than the input function and in a manner different from the analog computing element being checked.

The arrangement of FIGURE 2 is particularly well adapted for simplifying error checking with nonlinear functions. To this end, the digital arithmetic unit 74 acts upon the sampled output data to perform an inverse, reverse or backward sequence function as compared with the analog computing element being checked, to restore the output data to its input data state prior to manipulation by the computing element being checked. Hence, the digital arithmetic unit 74 would multiply to test analog division, add to test analog subtraction, square to test analog square root extraction, integrate to test analog differentiation, etc. In this manner, a more nearly straight line error function is generated by the digital comparator 46 and, hence, the digital correction signal generated by the arithmetic unit 74 is more reliable. This approach also minimizes the need for multiple point checking of nonlinear simulating elements.

Figure 3:
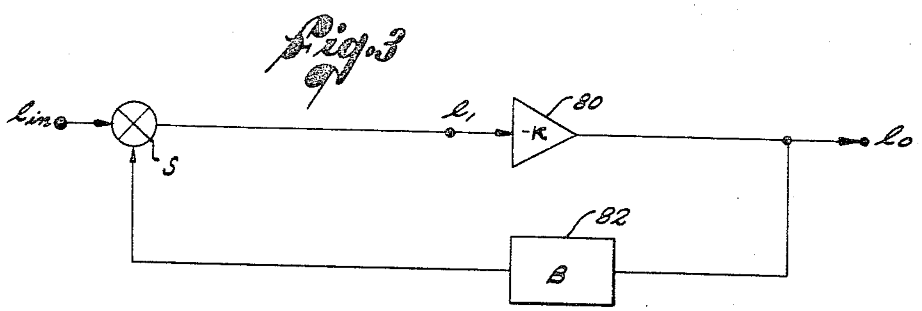
FIGURE 3 is a block diagram of a simple analog computer for the purpose of explaining the manner in which the analog computer can be made subject to digital control.

Referring to FIGURE 3 of the drawings, there is shown a single operational amplifier section such as might typically be encountered as one or more of the analog computing elements for the analog computer 10 in the system of FIGURE 1. In order to facilitate a better understanding of the manner in which the hybrid computer system of FIGURES 1 and 2 operate to check and readjust the various analog computing elements of the analog computer, the following analysis of the operational amplifier section of FIGURE 3 is provided.

The operational amplifier section of FIGURE 3 includes an operational amplifier 80, the input to which is $e_1$ and the output from which is $e_0$. The output of the amplifier 80 is electrically connected through an appropriate feedback network 82 to a summing junction S at the input to the amplifier, the summing junction receiving as a second input the signal $e_{in}$. The feedback network 82 provides a feedback function $\beta$, the characteristics of which determine the type of analog operation performed by the entire operational amplifier section upon the input $e_{in}$ to produce the output $e_0$.

Since the gain of the amplifier 80 is $-k$ and the input signal to the amplifier is $e_1$, then $$e_0=-ke_1 \quad (1)$$

Setting up a nodal equation at the summing junction S yields:

$$e_1=e_{in}+\beta e_0 \quad (2)$$

Substituting Equation 1 into Equation 2 yields:

$$e_0=-ke_{in}-k\beta e_0 \quad (3)$$

Simplifying Equation 3 yields:

$$e_0(1+k\beta)=-ke_{in}$$

or $$e_0=\frac{-ke_{in}}{1+k\beta} \quad (4)$$

Assuming that the gain $-k$ of the operational amplifier 80 is extremely high, then $$k\beta>>1$$

and equation 4 reduces to:

$$e=\frac{-e_{in}}{\beta} \quad (5)$$

Hence, it will be apparent from Equation 5 that the output signal $e_0$ is effectively solely a function of the feedback function $\beta$ in the feedback network 82.

Figure 5:
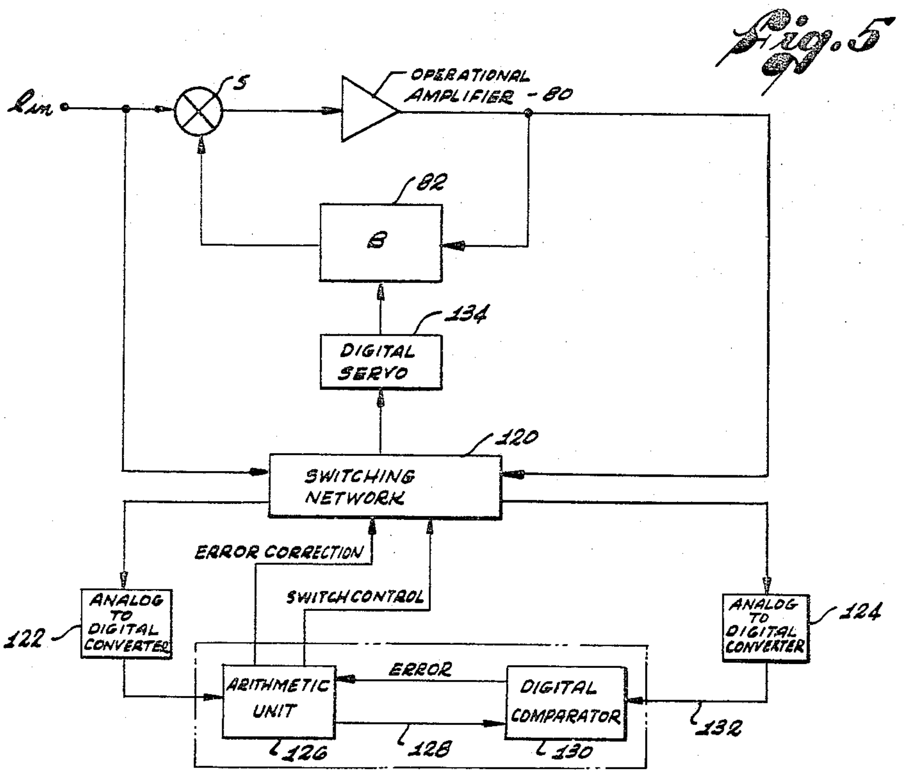
FIGURE 5 is a block diagram of another system for checking and adjusting the feedback network of an analog computing section.

In the typical operational amplifier section encountered in an analog computer, the feedback network 82 may be implemented with any combination of passive and/or active elements to perform a wide variety of functions such as addition, subtraction, multiplication, division, square root extraction, etc. These passive and active elements, such as variable potentiometers, diodes, transistors, capacitors and the like, have certain inherent characteristics which affect their stability under varying conditions of temperature, humidity, etc. The resultant instability takes the form of drift and gives rise to inaccuracies in the analog computation. Hence, it is contemplated, in accordance with the present invention, to detect errors in the $\beta$ function of the feedback network 82 and correct or readjust the values of various circuit components within the feedback network to compensate the $\beta$ function for any drift that has occurred. This checking and readjustment may be accomplished continuously wtihout in any way interferring with the normal operation of the analog computer, as is best illustrated in the systems of FIGURES 4 and 5.

Figure 4:
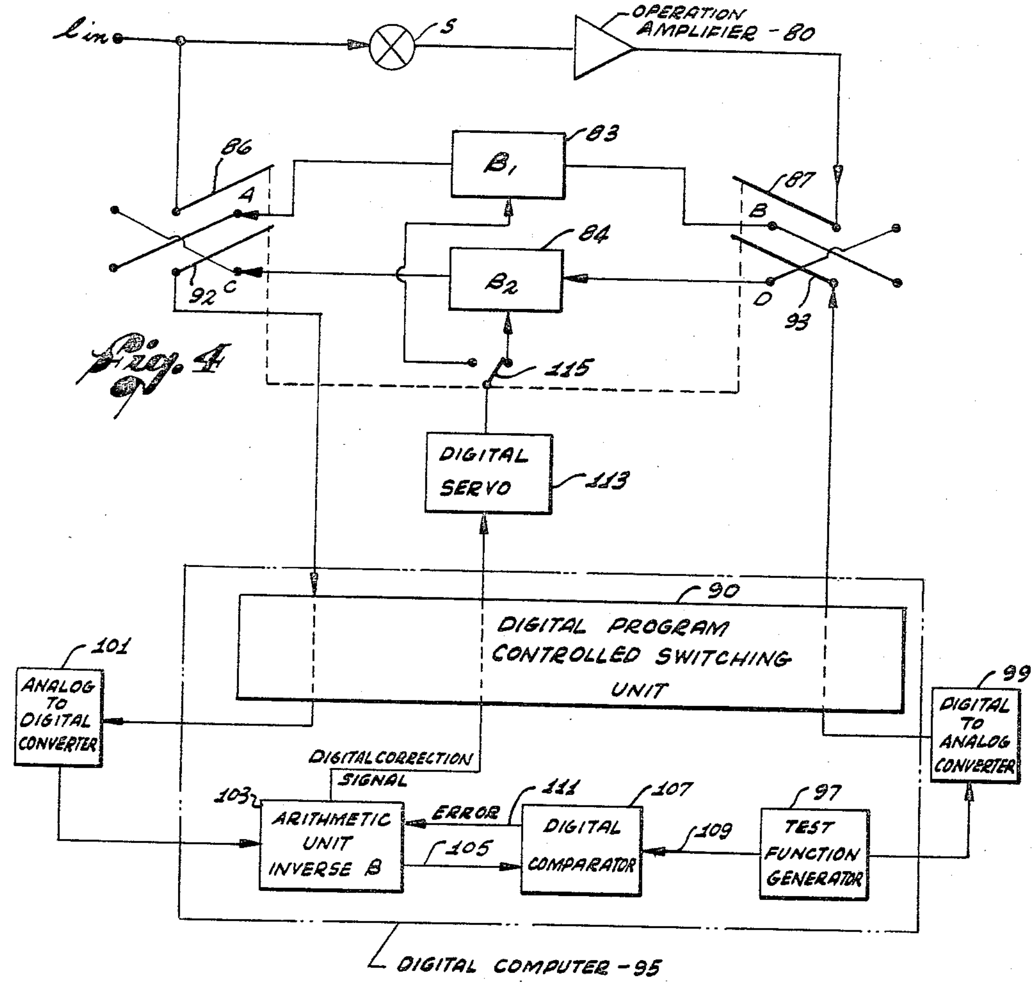
FIGURE 4 is a block diagram of one system for checking and adjusting the feedback network of an analog computing section.

Referring to FIGURE 4 of the drawings, the operational amplifier 80 is provided with a pair of $\beta_1$ feedback networks 83, 84 having feedback functions and $\beta_2$, respectively. The feedback functions $\beta_1$ and $\beta_2$ are intended to be identical, and their respective feedback networks are provided with input and output connection terminals A–B and C–D, respectively.

The operational amplifier section is also provided with a pair of switches 86, 87 which are ganged together and operated by a digital program controlled switching unit 90 for selectively connecting one or the other of the networks 83, 84 into the feedback loop around the amplifier 80. A second pair of ganged switches 92, 93 also operated by the digital program controlled switching unit 90, is synchronized with the operation of the switches 86, 87 to connect into the digital checking system of the feedback network 83 or 84 which has not been connected into the analog system. In this manner, each of the feedback networks 83, 84 is alternately subject to checking and readjustment by the digital computer 95 while the other feedback network remains connected into the analog system so that the analog computer can operate without interruption.

The digital checking and readjustment system is next described. A test function generator 97 generates a digital word which is converted to an analog signal by means of a digital to analog converter 99. The output of the converter 99 is directed as an input to the feedback network 84 which has been switched out of the operational amplifier section so that the feedback network can be checked.

The feedback network 84 operates upon the analog input signal in accordance with its feedback function $\beta_2$ and produces an output which is directed to an analog to digital converter 101. The digital output from the converter 101 is, in turn, directed to an arithmetic unit 103 within the digital computer 95. The arithmetic unit 103 performs an inverse $\beta$ function upon the digital input and directs its output over line 105 to a digital comparator 107 which receives as a second input over line 109 the original word output of the test functions generator 97.

If the feedback function $\beta_2$ is being performed accurately, then the output of the arithmetic unit 103 performing an inverse $\beta$ function should be the same as the original word generated by the test function generator 97. If the feedback function $\beta_2$ is not being performed accurately, then the output of the arithmetic unit will be something other than the original test word. Hence, the digital comparator 107 generates an error signal in accordance with the deviation between the output of the arithmetic unit 103 and the original test word. This error signal is directed over line 111 to the arithmetic unit 103 which operates on the error signal to derive a digital correction signal which, in turn, is directed to a digital servo 113. The digital servo 113 is thus stepped to alter the values of various elements in the feedback network 84 and thereby compensate its $\beta_2$ feedback function for the detected error, if any.

Means schematically depicted by the switch 115 in the block diagram of FIGURE 4 indicate that the digital servo 113 steps only the particular feedback network being checked and not the feedback network which remains connected into the analog loop. Of course, the means 115 is likewise under the control of the switching unit 90 so that, when the positions of the feedback networks 83 and 84 are reversed, the digital servo system will correct the feedback network 83 rather than the network 84.

The digital program controlled switching unit 90 steps the digital computer 95 through the various operational amplifier sections of the analog computer so that the digital computer can perform its programmed error detecting and correcting routines. The switching unit 90 can also be programmed to vary the rate at which the various sections and their elements are error checked and corrected, so that the more error prone elements are checked and corrected more frequently than the less error prone elements and hence, the digital computer 95 is used most efficiently.

Referring now more particularly to FIGURE 5 of the drawings, an operational amplifier section is illustrated wherein the amplifier 80 is provided with only a single feedback network 82, instead of the pair of feedback networks 83, 84 as in the system of FIGURE 4. Moreover, instead of generating a special test function, the system of FIGURE 5 uses a normal input to the analog computer for the checkout process.

Essentially, the analog and digital computers in the system of FIGURE 5 solve the same problem concurrently, and the two solutions are then compared digitally to derive an error signal. Simultaneous hacks are taken of the input and output analog functions to the operational amplifier section (the sample and hold memories being omitted from the drawings for purposes of simplification) and are directed through a switching network 120 to appropriate input and output analog to digital converters 122, 124, respectively.

In much the same manner as in the system of FIGURE 1, the output of the converter 122 is directed as an input to a digital arithmetic unit 126 which digitally solves the problem and sends the results over line 128 to a digital comparator 130. The digital comparator 130 receives as a second input, over line 132, the output from the converter 124. The error signal detected by the digital comparator 130 is directed back to the arithmetic unit 126 which produces an error correct signal and directs the latter through the switching network 120 to a digital servo 134. The digital servo 134 is stepped by the correction signal to change values of the components in the feedback network 82 and thus compensate the $\beta$ function for any detected error. The switching network 120 is under the control of the arithmetic unit 126 to sample the various operational amplifiers sections of the analog computer in accordance with the anticipated drift rates of the various computing sections.

It will be apparent from the foregoing that, while particular forms of my invention have been illustrated and described, various modifications that can be made without departing from the spirit and scope of my invention. Accordingly, I do not intend that my invention be limited, except as by the appended claims.

I claim:

1. A computer system, comprising:
analog computer means including a plurality of analog elements in matched pairs;
means for selectively switching alternate analog elements in each matched pair into and out of the operating circuit of said analog computer means;
digital correction means for adjusting the values of individual analog elements switched out of the operating circuit of said analog computer;
test function generating means for directing input data to a particular analog element being checked;
digital computer means for digitally operating upon the output data from said particular analog element being checked in accordance with the reverse mathematical function performed by said particular analog element being checked;

comparison means for digitally comparing the output data from said digital computer means with the input data to said particular analog element being checked and for producing an error signal indicative of the difference therebetween;

means for generating a digital correction signal in response to said error signal;

and means for selectively directing said digital correction signal to said correction means, whereby said particular analog element being checked is readjusted to compensate for variations from its proper value.

2. A system as set forth in claim 1, wherein said analog elements include the feedback networks of operational amplifier sections.

References Cited

UNITED STATES PATENTS

| | | | |
|---|---|---|---|
| 2,932,471 | 4/1960 | Exner et al. | 235—150.5 X |
| 3,033,453 | 5/1962 | Lode | 235—153 |
| 3,034,718 | 5/1962 | Freitas et al. | 235—151.1 |
| 3,250,897 | 5/1966 | Vasu et al. | 235—194 X |

OTHER REFERENCES

Pages 190–191, June 1959, IRE Transactions on Electronic Computers, vol. #C8, No. 2.

MALCOLM A. MORRISON, *Primary Examiner.*

A. J. SARLI, M. P. HARTMAN, *Assistant Examiners.*